July 2, 1968     R. GILMONT     3,390,702
ADJUSTABLE VALVE FOR LOW FLUID FLOW
Filed Dec. 2, 1964     2 Sheets-Sheet 1

INVENTOR
ROGER GILMONT
BY
ATTORNEY

July 2, 1968 R. GILMONT 3,390,702
ADJUSTABLE VALVE FOR LOW FLUID FLOW
Filed Dec. 2, 1964 2 Sheets-Sheet 2
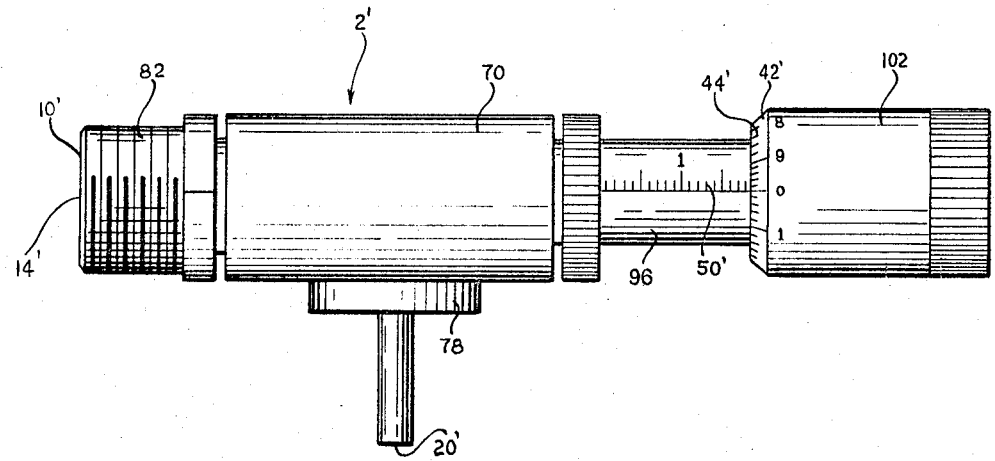
FIG.4.
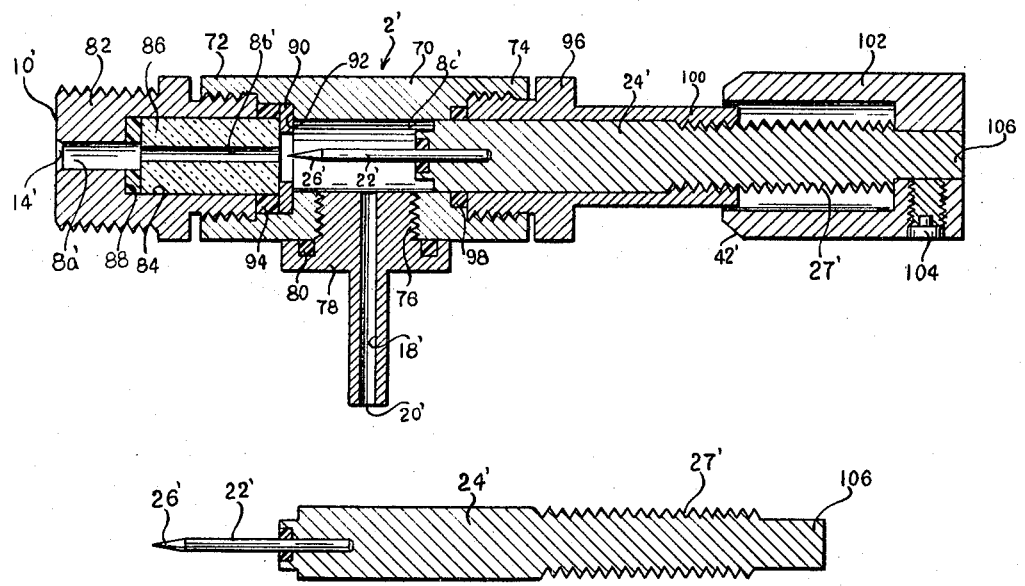
FIG.5.
FIG.6.
INVENTOR
ROGER GILMONT
BY James and Franklin
ATTORNEY

United States Patent Office 3,390,702
Patented July 2, 1968

3,390,702
ADJUSTABLE VALVE FOR LOW FLUID FLOW
Roger Gilmont, Douglaston, N.Y., assignor to Roger Gilmont Instruments, Inc., Great Neck, N.Y., a corporation of New York
Filed Dec. 2, 1964, Ser. No. 415,376
3 Claims. (Cl. 138—45)

The present invention relates to a valve construction by means of which accurate control of low rates of fluid flow, such as 10 cc./hr. of air, can be achieved.

There are many applications where the adjustment and control of very low rates of fluid flow is desired. A dramatic example is where strong anesthetics must be administered during an operation. Control of continuing chemical reactions often involves such requirements, as does mass spectrometry and gas chromatography. The control instrumentalities which have been available for these purposes in the past have been complex and expensive, and their adjustment has often been quite delicate and difficult to accomplish.

The prime object of the present invention is to devise a simple, sturdy and relatively inexpensive device which will provide the desired degree of control, particularly with regard to very low rates of fluid flow, and which will also provide such control over a relatively wide range of fluid flow, such as between 10 cc./hr. and 10,000 cc./hr. of a gas such as air, or ⅙ cc./hr.–167 cc./hr. of a liquid such as water. These values, it will be understood, represent the operating range of a single specific embodiment of the present invention, and through appropriate design in accordance with the teachings of the present invention various other rates of flow for the same or different fluids could be achieved.

In accordance with the present invention the fluid to be controlled is caused to flow through an elongated narrow capillary passage, preferably of annular shape, the length of that passage being adjusted in order to control the rate of flow of fluid therethrough. If desired, and as here specifically disclosed, this type of flow control can be combined with a more conventional needle-valve type of operation in order to extend the range of control and render the rate of control more gradual between the upper and lower limits thereof.

To this end the device of the present invention, generically considered, comprises a body having an inlet port and an outlet port with an elongated passage located in fluid communication between those ports. An elongated member such as a rod is adapted to be received within that passage and adjustably positionable therealong. The difference between the inner diameter of the passage and the outer diameter of the rod is such as to produce therebetween a narrow capillary passage, preferably annular in shape, through which the fluid is to flow. The degree to which the rod is inserted into the passage will determine the length of that capillary passage, and hence will determine the resistance which the valve will offer to the flow of fluid therethrough. When the thus-formed passage is of elongated capillary size, and particularly when it is annular in cross-sectional shape, the fluid flow therethrough will be laminar in nature, and as a result close control can be achieved of the fluid flow rate even though that rate may be very small. The positioning of the rod along the passage can be accomplished in any appropriate manner, as through the use of an accurately machined lead screw. A very fine thread can be employed in that screw, thereby permitting close and accurate adjustment of the valve. With simple constructions of the type here specifically disclosed an overall controlled flow range of 1000:1 can readily be achieved. While certain parts of the valve of the present invention (the rod, the passage in which it is received and to a lesser degree the lead screw which controls the position of the rod) require a high degree of dimensional precision, those parts constitute only a small proportion of the overall valve structure, and the remainder of the valve structure can be made to rather loose tolerances. All of the parts are readily manufactured and assembled, so that the structure of the present invention is relatively inexpensive, surprisingly less expensive than prior art devices used for comparable purposes, and exceptionally sturdy and reliable in operation.

To the accomplishment of the above, and to such other objects as may hereinafter appear, the present invention relates to an adjustable valve construction, as defined in the appended claims and as described in this specification, taken together with the accompanying drawings, in which:

FIG. 4 is a side elevational view of a second embodiment of the present invention;

FIG. 5 is a cross sectional view of the embodiment of FIG. 4; and

FIG. 6 is a cross sectional view of the rod and mounting structure of the embodiment of FIG. 5.

Figure 1:
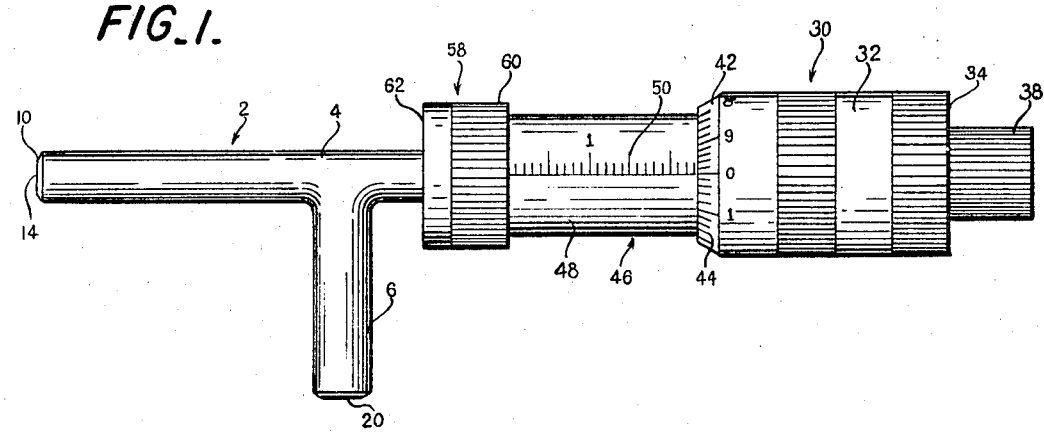
FIG. 1 is a side elevational view of a first embodiment of the present invention.
Figure 2:
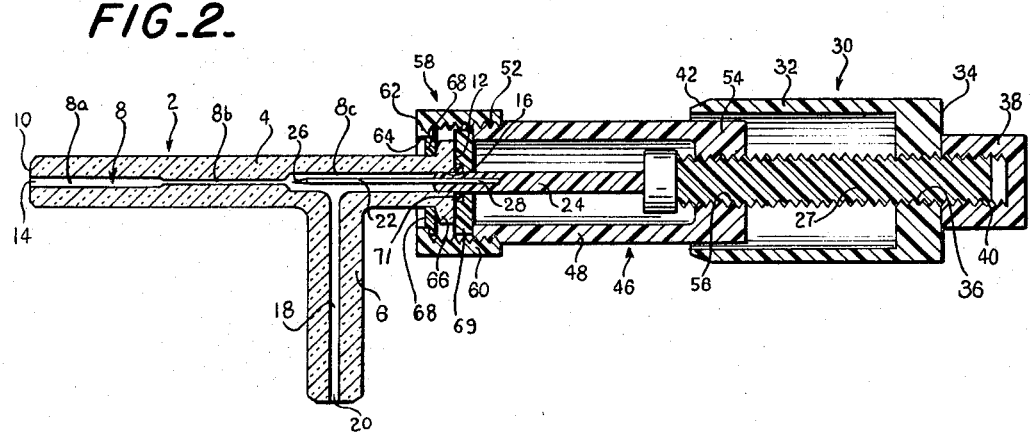
FIG. 2 is a cross sectional view of the embodiment of FIG. 1.
Figure 3:
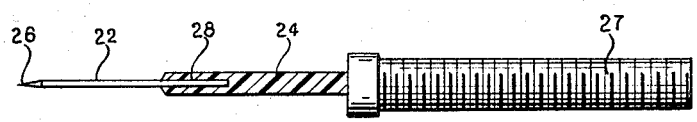
FIG. 3 is a plan view, partially cross sectioned, of the assembly comprising the adjustably positionable elongated rod and the structure to which it is directly attached.

The valve of the embodiment of FIGS. 1–3 comprises a body generally designated 2, which may be formed completely of glass or other suitable material, that body comprising a longitudinally extending portion 4 having a portion 6 extending laterally therefrom. A passage generally designated 8 extends through the body portion 4 from one end 10 to the other end 12 thereof, the passage 8 opening onto the end 10 to define a port 14 and opening onto the end 12 to define a port 16. That portion 8a of the passage 8 adjacent the end 10 has any convenient diameter, such as that of a standard 1 mm. capillary. It communicates with a narrower passage portion 8b, which in turn communicates with a wider passage portion 8c, the latter extending to the port 16. A passage 18 extends through the laterally extending body portion 6 and communicates between the passage portion 8c and a port 20 defined at the end of the body portion 6. The ports 14 and 20 comprise the inlet and outlet ports respectively of the valve, although it will be appreciated that the terms "inlet" and "outlet" can be applied interchangeably.

The valve adjusting member is in the form of an elongated rod or the like 22 which is supported by mounting stem 24 so as to extend out from the latter. The free tip 26 of the rod 22 may be tapered to a needle point. The rod 22 may be formed of any suitable structural material, although metal such as stainless steel is preferred by reason of manufacturing convenience and resistance to corrosion. The mounting stem 24 may be formed of plastic such as polytetrafluoroethylene, and is made integral with an externally threaded driving member 27.

The cross sectional size and shape of the mounting stem 24 is such that it is slidably received within the passage portion 8c. It is preferred that the mounting stem 24 be formed of polytetrafluoroethylene or similar composition because of the resistance which that material has to attack by chemicals and because of the characteristic of that material to freely slide through and make a seal with the inner surface of a passage such as the passage portion 8c. The rod 22 may be secured to the mounting stem 24 by being press fitted into an aperture 28 formed at the end of the stem 24. The rod 22 is of a cross sectional size and shape corresponding to but slightly smaller than the cross sectional size and shape of the passage portion 8b.

There is therefore formed between the rod 22 and the passage portion 8b a passage of capillary size through which fluid can flow from the inlet port 14 to the outlet port 20, the equivalent diameter of that passage being defined by the difference between the outer diameter of the rod 22 and the inner diameter of the passage portion 8b. That equivalent diameter should be on the order of 1% of the diameter of the rod 22. The length of that capillary passage or clearance is determined by the distance to which the rod 22 is inserted into the passage portion 8b. The insertion distance should, for best results, be at least 5 to 10 times the diameter of passage portion 8b, and preferably of considerably greater length.

Purely by way of example, the inner diameter of the passage portion 8b may be 0.0276 in., while the outer diameter of the rod 22 may be 0.0274 in., thus producing between them a capillary passage the equivalent diameter of which is .0002 in., and the distance of travel of the rod 22 (exclusive of its tapered tip 26) along passage portion 8b may be .375 in.

Any suitable mechanism may be employed for positioning the rod 22 along the passage 8b. As here specifically disclosed in FIGS. 1–3, that adjustment structure comprises a sleeve generally designated 30 having a skirt portion 32 and a hub portion 34, the latter having an internally threaded opening 36 through which the driving member 27 is threadedly received. A locking nut 38 has an internally threaded opening 40 into which the outwardly projecting end of the rotary driving member 27 is adapted to be received, the lock nut 38 permitting the sleeve 30 to be adjustably axially positioned relative to the rotary driving member 27 and then locked in position. The left hand end of the skirt 32 is provided with a bevelled surface 42 on which circular micrometer graduations 44 are provided. The sleeve 30 and lock nut 38 may be formed of polypropylene.

A barrel generally designated 46 is provided with a body portion 48 having a axial micrometer-type graduations 50 adapted to cooperate with the left hand edge of the sleeve 30 and the circular graduations 44 thereon. The left hand end of the barrel 46 has an externally threaded portion 52 and the right hand end thereof has an end wall 54 provided with an internally threaded passage 56 through which the rotary driving member 27 extends in threaded engagement. A nut generally designated 58 is provided with an internally threaded body portion 60 within which the portion 52 of the barrel 46 is received, and is further provided with an end wall 62 having a central passage 64. The end 12 of the body 2 is provided with an outwardly extending flange 66, which is engaged by a Teflon washer 69 pressed thereagainst by the left hand end of the barrel 46, the flange 66 being pressed thereby against an adapter washer 68 which in turn is pressed against the end wall 62 of the nut 58. The barrel 46 and nut 58 may be formed of polypropylene, and the adapter washer 68 may be formed of polytetrafluoroethylene. A Viton rubber O-ring 71 is carried by the radially inner portion of the washer 69 and sealingly engages the mounting stem 24 which is slidable therethrough.

Thus the mounting and positioning structure for the rod 22 is reliably held in place on the right hand end of the body 2, and by rotating the sleeve 30 the rod 22 is moved axially into and along the passage portion 8b. In one extreme operative position, illustrated in FIG. 2, corresponding to the unscrewing of the sleeve 30, the rod 22 and its tip 26 are completely removed from the passage 8b. In its other extreme operative position, corresponding to the screwing in of the sleeve 30, the rod 22 is inserted into the passage portion 8b and extends along that passage portion for a substantial part of its length.

When the rod 22 is received within the passage portion 8b, and when the relative diameters of those parts are within the ranges set forth above, the flow of fluid between those parts apparently acts to center the rod 22 within the passage portion 8b, thereby producing an annular capillary passage therebetween through which the fluid flows. That flow apparently is laminar in nature, at least when the rod 22 is received within the passage portion 8b to an appreciable extent. The tapered needle-like tip 26 of the rod 2 may play a part in assisting the centering of the rod 22 within the passage portion 8b when fluid flows therethrough.

In a typical embodiment, when the rod 22 is inserted to its full operative extent (.25 inch exclusive of tip 26), as little as 10 cc./hr. of air will flow through the valve when there is a pressure differential of 1 p.s.i. between the inlet and outlet ports 14 and 20, and the flow will be proportional to that pressure differential, apparently because of the essentially laminar nature of the flow. The flow for different fluids will be inversely proportional to the viscosity of those fluids. Withdrawal of the rod 22 along the passage portion 8b by a distance of ¼ inch will cause the rate of fluid flow to increase approximately by a factor of 10, the flow apparently retaining its laminar character. During the next ⅛ inch of withdrawal of the rod 22 the rate of fluid flow increases approximately by another factor of 10, the nature of the flow apparently being transitional between laminar and non-laminar. At the end of the latter withdrawal substantially only the needle-like tip 26 will remain within the passage portion 8b. Further withdrawal of the rod 22 (or, more strictly, the needle-like tip 26 thereof) from the passage portion 8b will produce conventional needle valve control permitting the flow rate to increase again by a factor of approximately 10. Consequently the valve provides for control of fluid flow over a range of 1000:1.

It will be noted that the passage portion 8c is considerably larger in cross section than the rod 22 which passes therethrough, so that fluid flow from the right hand end of the narrow passage portion 8b to and through the outlet passage 18 is relatively free and unimpeded. The mounting stem 24 substantially or completely prevents fluid flow out through the port 16, and the location of the outlet passage 18 is such that it is ordinarily located in advance (to the left as viewed in the drawings) of the end of the stem 24. However, if desired, the position of the parts could be so related that when the stem 24 is moved inwardly along the passage portion 8c to a predetermined degree it could block the upper end of the outlet passage 18, thus producing a positive valve-closing action.

The embodiment of FIGS. 4–6 is functionally similar to the embodiment of FIGS. 1–3, but differs from the preceding embodiment in construction, and particularly in the fact that the valve body is formed primarily of metal.

Thus the body 2' of the embodiment of FIGS. 4–6 comprises a tube 70 having internally threaded ends 72 and 74 and an internally threaded side opening 76 into which outlet adapter 78 is screwed, a sealing ring 80 being interposed between the adapter 78 and tube 70. An inlet bushing 82 is screwed into the end 72 of the tube 70, that bushing having an inlet orifice 14' communicating with a passage portion 8a' and having a wider opening 84 at its right hand end. A glass tube 86 is received within the opening 84, a sealing washer 88 being interposed between the left hand end of the glass tube 86 and the body of the bushing 82. The passage portion 8b' extends through the glass tube 86. The glass tube 86 is pressed into place by means of the washer 90 engaged by a shoulder 92 on the tube 70, and a sealing ring 94 is adapted to be compressed axially between the right hand end of the bushing 82 and the washer 90 and compressed radially between the right hand end of the glass tube 86 and the tube 70. The glass tube 86 may be received within the bushing 82 with a slight radial clearance therearound. The elongated rod 22' with its tapered needle-like tip 26' is mounted in any appropriate manner in mounting stem 24', that stem being snugly slidable through the passage portion 8c' defined by the interior of the tube 70. A barrel 96 is screwed into the end 74 of the tube 70, a sealing ring 98 being compressed therebetween, and the driving stem 24' is slidable through the barrel 96. The externally threaded rear portion 27' of the mounting stem 24' threadedly engages the internally threaded right hand end 100 of the barrel 96, and a sleeve 102 is secured in any appropriate manner, as by means of set screw 104, to the extending end 106 of the stem 24'. As in the embodiment of FIGS. 1–3, the sleeve 102 may be provided with a bevelled surface 42' carrying circular micrometer graduations 44' which cooperate with axial graduations 50' formed on the outside of the barrel 96.

The dimensional relationships between the rod 22' and the passage portion 8b' in the embodiment of FIGS. 4–6 are of the same nature as the relationships between the dimensions of the rod 22 and the passage portion 8b of the embodiment of FIGS. 1–3. Thus, by way of example, the inner diameter of passage portion 8b' may be .0450 in. and the outer diameter of rod 22 may be .0445 in. It will be appreciated, therefore, that the functioning of the embodiment of FIGS. 4–6 in adjustably controlling the flow of fluid from the inlet port 14' to the outlet port 20' formed at the lower end of the passage 18' which passes through the outlet adapter 78 is essentially the same as that of the embodiment of FIGS. 1–3. The aforementioned clearance between glass tube 86 and bushing 82 facilitates the centering of the rod 22' within the passage portion 8b', and hence the attainment of the annular shape of the fluid flow passage.

As a result of the constructions here disclosed, combining a capillary passage 8b or 8b' with a closely fitting precision ground elongated element 22 or 22', controlled flow, apparently of a laminar type, through a capillary passage which is preferably of annular form is achieved, and by adjusting the axial length of that flow passage, close control over the rate of flow is achieved over a wide range. The extent of the adjustable range can further be increased by providing the rod 22 or 22' with a needle-like tip 26 or 26'. The structure involved is simple and sturdy, and only those parts which cooperate in producing the actual elongated passage through which controlled flow occurs need be made to any particularly high degree of dimensional accuracy. As a result the valve of the present invention may be manufactured extremely inexpensively, is exceptionally sturdy and reliable, and may be adjusted in an extremely facile manner. Moreover, because the elongated rod 22 or 25, together with its mounting and adjusting mechanism, may readily be removed from the stationary portion of the valve structure, cleaning of the valve parts is easily accomplished, and replacement of individual parts or subassemblies is facilitated.

While but a limited number of embodiments of the present invention are here specifically disclosed it will be apparent that many variations may be made therein, all within the scope of the invention as defined in the following claims.

I claim:

1. An adjustable valve comprising a body having a passage communicating between an inlet port and an outlet port, said passage including an elongated portion of a given substantially uniform inner diameter, an elongated member having a substantially uniform outer diameter smaller than said inner diameter and slidably received in said passage portion, and means mounting said member on said body for adjustable movement along said passage portion, the outer diameter of said member being so related to the inner diameter of said passage portion as to define, when the former is in the latter, a clearance therebetween of substantially uniform diameter along its length having an equivalent diameter on the order of 1% of the diameter of said elongated member, and precision indicator means on said body operatively connected to said member and effective accurately to externally indicate the axial position of said member along said passage.

2. An adjustable valve comprising an elongated body having a passage communicating between first and second ends thereof, said passage including a first portion of substantially uniform predetermined diameter leading into an enlarged portion which in turn opens onto said first end of said body, a port in said body communicating with said enlarged passage portion, an elongated member having a substantially uniform outer diameter smaller than the inner diameter of said first passage portion and received within said first passage portion so as to define a clearance between the two of substantially uniform diameter along its length having an equivalent diameter on the order of 1% of the diameter of said elongated member, and means operatively connected to said body at said first end and operatively connected to said member for adjustably positioning said member relative to and along said first passage portion between extreme operative positions differently axially located relative to said first passage portion and in at least one of which positions said member is received within said first passage portion to a predetermined distance therealong, said predetermined distance being at least on the order of five times the diameter of said first passage portion, and precision indicator means on said body operatively connected to said member and effective accurately to externally indicate the axial position of said member along said passage.

3. An adjustable valve comprising an elongated body having a passage communicating between first and second ends thereof, said passage including a first portion of substantially uniform predetermined diameter leading into an enlarged portion which in turn opens onto said first end of said body, a port in said body communicating with said enlarged passage portion, an elongated member having a substantially uniform outer diameter smaller than the inner diameter of said first passage portion and receivable within said first passage portion so as to define a clearance between the two of substantially uniform diameter along its length having an equivalent diameter on the order of 1% of the diameter of said elongated member, and means operatively connected to said body at said first end and operatively connected to said member for adjustably positioning said member relative to and along said first passage portion between a first extreme position removed from said first passage portion and a second extreme position inserted into said first passage portion to a predetermined distance, said predetermined distance being at least on the order of five times the diameter of said first passage portion, and precision indicator means on said body operatively connected to said member and effective accurately to externally indicate the axial position of said member along said passage.

References Cited

UNITED STATES PATENTS

| | | | |
|---|---|---|---|
| 2,014,314 | 9/1935 | Defenbaugh | 138—46 X |
| 2,621,909 | 12/1952 | Stearns. | |
| 2,344,943 | 3/1944 | Gooden | 138—45 |
| 2,558,356 | 6/1951 | Greene | 138—45 |
| 3,135,994 | 6/1964 | Skinner | 138—45 XR |

LAVERNE D. GEIGER, *Primary Examiner.*

B. KILE, *Assistant Examiner.*